(12) United States Patent
Hashimoto et al.

(10) Patent No.: US 7,860,584 B2
(45) Date of Patent: Dec. 28, 2010

(54) METHOD, COMPUTER, AND RECORDING MEDIUM STORING A PROGRAM FOR COMPUTING AN OPTIMAL SOLUTION TO ENGINE DESIGN VARIABLES

(75) Inventors: Yoshihiro Hashimoto, Yokohama (JP); Yuichiro Sampei, Yokohama (JP); Tomoyuki Hiroyasu, Kyotanabe (JP)

(73) Assignees: ONO Sokki Co., Ltd., Kanagawa (JP); The Doshisha, Kyoto (JP)

( * ) Notice: Subject to any disclaimer, the term of this patent is extended or adjusted under 35 U.S.C. 154(b) by 253 days.

(21) Appl. No.: 12/214,113

(22) Filed: Jun. 17, 2008

(65) Prior Publication Data
US 2008/0319928 A1    Dec. 25, 2008

(30) Foreign Application Priority Data
Jun. 19, 2007    (JP) .............................. 2007-161819

(51) Int. Cl.
*G05B 13/02*    (2006.01)
*G06F 11/30*    (2006.01)
*G06C 17/00*    (2006.01)
*G06F 7/60*    (2006.01)
*G06F 17/10*    (2006.01)

(52) U.S. Cl. .............................. 700/28; 700/30; 700/31; 700/46; 700/73; 700/74; 702/183; 703/2; 703/7; 706/13

(58) Field of Classification Search ............. 700/28–31, 700/46, 73–74; 706/13; 702/183; 703/2, 703/7
See application file for complete search history.

(56) References Cited

U.S. PATENT DOCUMENTS

| | | | | |
|---|---|---|---|---|
| 5,146,324 A | * | 9/1992 | Miller et al. | 375/240.03 |
| 5,677,857 A | * | 10/1997 | Hayashi et al. | 703/8 |
| 6,132,108 A | * | 10/2000 | Kashiwamura et al. | 703/2 |
| 6,411,945 B1 | * | 6/2002 | Nakajima | 706/19 |
| 2005/0082706 A1 | * | 4/2005 | Nagaoka et al. | 264/40.1 |
| 2006/0161391 A1 | * | 7/2006 | Inaba et al. | 702/183 |
| 2006/0233637 A1 | * | 10/2006 | Yakushi et al. | 415/13 |
| 2009/0210366 A1 | * | 8/2009 | Sakata et al. | 706/13 |

FOREIGN PATENT DOCUMENTS

JP    11-353298    12/1999

\* cited by examiner

*Primary Examiner*—Ramesh B Patel
(74) *Attorney, Agent, or Firm*—Dilworth & Barrese, LLP (57) ABSTRACT

A method, computer, and recording medium storing a program are provided which, based on local optimal solutions, more efficiently calculate an optimal global optimal solution in a global operating area. System calculates the global optimal solution by solving, using a genetic algorithm based on the local optimal solutions and the initial values, an equation, which should be satisfied by the plurality of design variables, by obtaining the plurality of combinations of design variables composing local optimal solutions for each design variable respectively calculated for each of a plurality of combinations of a plurality of operating states, and by obtaining initial values for the plurality of combinations of design variables used for calculating the global optimal solution.

8 Claims, 12 Drawing Sheets

FIG. 6A MODE 1
FIG. 6B MODE 2
FIG. 6C MODE n
FIG. 6D INITIAL VALUES OF GLOBAL OPTIMIZATION $W_1 \cdot D_{11} + W_2 \cdot D_{21} + W_n \cdot D_{n1}$ : PARETO SOLUTION $D_{MODE\ NUMBER,\ DATA\ NUMBER}$ : PARETO SOLUTION
$W_{MODE\ NUMBER}$ : WEIGHTING FACTOR IN EACH MODE FOR EXAMPLE, SUFFIXES ARE APPENDED TO PARETO SOLUTIONS IN MODES 1 THROUGH n. THE VALUE OBTAINED BY SUMMATING THE PARETO SOLUTIONS WITH THE SAME SUFFIXES IS USED AS THE INITIAL VALUE.

METHOD, COMPUTER, AND RECORDING MEDIUM STORING A PROGRAM FOR COMPUTING AN OPTIMAL SOLUTION TO ENGINE DESIGN VARIABLES

This application is based on and claims the benefit of priority from Japanese Patent Application No. 2007-161819, filed on 19 Jun. 2007, the content of which is incorporated herein by reference.

BACKGROUND OF THE INVENTION

1. Field of the Invention

The present invention relates to a method, a computer, and a program for calculating an optimal solution of engine design variables. More specifically, it relates to a method, a computer, and a program for calculating an global optimal solution of design variables (e.g., valve position of exhaust gas recirculation (EGR), fuel injection timing, ignition timing, and the like) which minimize or maximize a combination of multiple objective variables (e.g., specific fuel consumption, nitrogen oxides emission concentration) for multiple combinations (modes) of multiple operating states (e.g., engine revolutions, loads, and the like) included in an operating area of the engine.

2. Related Art

Conventionally, various methods have been proposed for calculating an optimal solution of engine design variables.

For example, a computer expresses a certain objective variable in quadratic polynomials of multiple design variables, and calculates using a genetic algorithm or other calculating methods for each of multiple combinations of multiple operating states. Thereby, it is possible to obtain local optimal solutions of design variables which minimize or maximize the multiple combinations of the objective variables.

Such local optimal solutions may not be combined as is for the purpose of calculating the global optimal solution of design variables which minimize or maximize the multiple combinations of the objective variables in the entire operating area.

On the other hand, according to Japanese Unexamined Patent Application Publication No. Hei 11-353298, a method of calculating a comprehensive evaluated value by calculating a local preliminary evaluated value for each segmented evaluation area, and evaluating the values comprehensively, has been proposed for evaluating an engine and the like using a genetic algorithm online.

However, a method of further efficiently calculating a global optimal solution of design variables which minimize or maximize multiple combinations of objective variables in an entire operating area based on local optimal solutions has not been disclosed in any way in Japanese Unexamined Patent Application Publication No. Hei 11-353298.

SUMMARY OF THE INVENTION

An object of the present invention is to provide a method, a computer, and a recording medium on which a program for further efficiently calculating a global optimal solution of design variables which minimize or maximize the multiple combinations of objective variables in an entire operating area based on local optimal solutions is recorded.

More specifically, the present invention provides the following.

According to a first aspect of the present invention, a method of calculating a global optimal solution of design variables (e.g., valve position of EGR, fuel injection timing, ignition timing, and the like) which minimize or maximize a combination of a plurality of objective variables (e.g., specific fuel consumption, nitrogen oxides emission concentration, and the like) for a plurality of combinations (e.g., modes) of a plurality of operating states (e.g., engine revolutions, loads, and the like) included in an operating area of an engine using a computer includes:

a step of obtaining local optimal solutions of the design variables which minimize or maximize a combination of the plurality of objective variables which are calculated for each of the plurality of combinations of the plurality of operating states;

a step of obtaining initial values of a combination of the plurality of design variables used for calculating the global optimal solution; and a step of calculating the global optimal solution by solving an equation which should be satisfied by the plurality of design variables using a genetic algorithm based on the local optimal solutions and the initial values.

With such configuration of the present invention, the computer obtains local optimal solutions of the design variables which minimize or maximize a combination of the plurality of objective variables which are calculated for each of a plurality of combinations of the plurality of operating states;

obtains initial values of a combination of the plurality of design variables used for calculating the global optimal solution; and calculates the global optimal solution by solving an equation which should be satisfied by the plurality of design variables, based on the local optimal solutions and the initial values, using a genetic algorithm.

Accordingly, the computer may calculate the global optimal solution using the genetic algorithm based on the initial values.

As a result, the computer may calculate the global optimal solution with fewer generation numbers of the genetic algorithm based on the initial values.

As a result, the present invention allows reduction of load on the computer for obtaining the global optimal solution.

Moreover, note that the computer may obtain the local optimal solutions by receiving an input from a user. Alternatively, the computer may obtain the local optimal solutions by receiving them from another computer connected via a communication network. Alternatively, the computer may obtain the local optimal solutions through calculation. More specifically, the computer may obtain the local optimal solutions by calculating an equation which is a certain objective variable expressed in a quadratic polynomial of the plurality of design variables using a genetic algorithm or other calculating methods for each of a plurality of combinations of the plurality of operating states.

In addition, the computer may similarly obtain the initial values by receiving an input from a user. Alternatively, the computer may obtain the initial values by receiving them from another computer connected via a communication network.

According to a second aspect of the present invention, with the method described in the first aspect, in the step of obtaining initial values, the initial values are obtained through summation of obtained local optimal solutions of the respective design variables and local optimal solutions of the plurality of objective variables which correspond to each other when arranged in ascending or descending order.

With such configuration of the present invention, the computer obtains the initial values through summation of obtained local optimal solutions of the respective design variables and local optimal solutions of the plurality of objective variables which correspond to each other when arranged in ascending or descending order.

Accordingly, the computer may further efficiently calculate the global optimal solution using a genetic algorithm based on relatively more appropriate initial values.

According to a third aspect of the present invention, with the method described in the first or the second aspect, in the step of calculating, the equation is the objective variables expressed in a polynomial equation of high degree including the plurality of design variables.

With such configuration of the present invention, the computer calculates the global optimal solution by solving a polynomial equation of high degree including the plurality of design variables which expresses the objective variables.

Accordingly, the computer may calculate the global optimal solution by solving a polynomial equation of high degree including the plurality of design variables which expresses the objective variables based on local optimal solutions for a plurality of design variables.

According to a fourth aspect of the present invention, with the method described in the first or the second aspect, in the step of calculating, the equation is the objective variables expressed in an RBF (Radial Basis Function) model equation including the plurality of design variables.

With such configuration of the present invention, the computer calculates the global optimal solution by solving an RBF (Radial Basis Function) model equation including the plurality of design variables which expresses the objective variables.

Accordingly, the computer may calculate the global optimal solution by solving an equation which expresses the objective variables in an RBF (Radial Basis Function) model equation including the plurality of design variables based on local optimal solutions for a plurality of design variables.

Here, an equation (approximate expression) usable with the present invention is not limited to the aforementioned polynomial equation of high degree or RBF model equation, and may be a nonlinear function which can be linearized through variable conversion. For example, an exponential function, power function, logarithmic function, logistic function, or the like may be used. In addition, spline interpolation, Lagrangian interpolation, or the like for multiple variables may be used.

According to a fifth aspect of the present invention, with the method described in any of the first through the fourth aspects, the operating states include at least revolutions of the engine and load on the engine.

With such configuration of the present invention, the computer may calculate the global optimal solution for the operating states which include at least revolutions of the engine and load on the engine.

Accordingly, the computer may calculate the global optimal solution for the operating states including at least revolutions of the engine and load on the engine, which are representative elements configuring the operating states.

According to a sixth aspect of the present invention, with the method described in any of the first through the fifth aspects, the objective variables include at least specific fuel consumption of the engine and nitrogen oxides emission concentration.

With such configuration of the present invention, the computer may calculate the global optimal solution for the design variables for objective variables including at least specific fuel consumption of the engine and nitrogen oxides emission concentration.

Accordingly, the computer may calculate the global optimal solution of the design variables for at least specific fuel consumption and nitrogen, which are representative objective variables.

According to a seventh aspect of the present invention, with the method of any of the first through the sixth aspects, a program which allows execution of processing in each of the steps is used.

According to an eighth aspect of the present invention, a computer for calculating a global optimal solution of design variables (e.g., valve position of EGR, fuel injection timing, ignition timing, and the like) which minimize or maximize a combination of a plurality of objective variables (e.g., specific fuel consumption, nitrogen oxides emission concentration, and the like) for a plurality of combinations (e.g., modes) of a plurality of operating states (e.g., engine revolutions, loads, and the like) included in an operating area of an engine includes:

a means of obtaining local optimal solutions of the design variables which minimize or maximize a combination of the plurality of objective variables which are calculated for each of the plurality of combinations of the plurality of operating states;

a means of obtaining initial values of a combination of the plurality of design variables used for calculating the global optimal solution; and a means of calculating the global optimal solution by solving an equation, which should be satisfied by the plurality of design variables, based on the local optimal solutions and the initial values, using a genetic algorithm.

By utilizing a computer described in the eighth aspect, it is possible to anticipate the same operation and effect as the contents described in the first aspect.

According to a ninth aspect of the present invention, a recording medium on which a program of instructing a computer to calculate a global optimal solution of design variables which minimize or maximize a combination of a plurality of objective variables for a plurality of combinations (e.g., modes) of a plurality of operating states (e.g., engine revolutions, loads, and the like) included in an operating area of an engine, includes:

a step of obtaining local optimal solutions for the design variables which minimize or maximize a combination of the plurality of objective variables which are calculated for each of the plurality of combinations of the plurality of operating states;

a step of obtaining initial values of a combination of the plurality of design variables used for calculating the global optimal solution; and a step of calculating the global optimal solution by solving an equation which should be satisfied by the plurality of design variables based on the local optimal solutions and the initial values, using a genetic algorithm.

By installing the program described in the ninth aspect in a computer and utilizing it, it is possible to anticipate the same operation and effect as the contents described in the first aspect.

According to the present invention, the computer may calculate the global optimal solution with fewer generation numbers of the genetic algorithm based on the initial values. As a result, it is possible to reduce load on the computer for obtaining the global optimal solution.

DETAILED DESCRIPTION OF THE INVENTION

Embodiments according to the present invention are described as follows while referring to the drawings.

[Entire System Structure]

Figure 1:
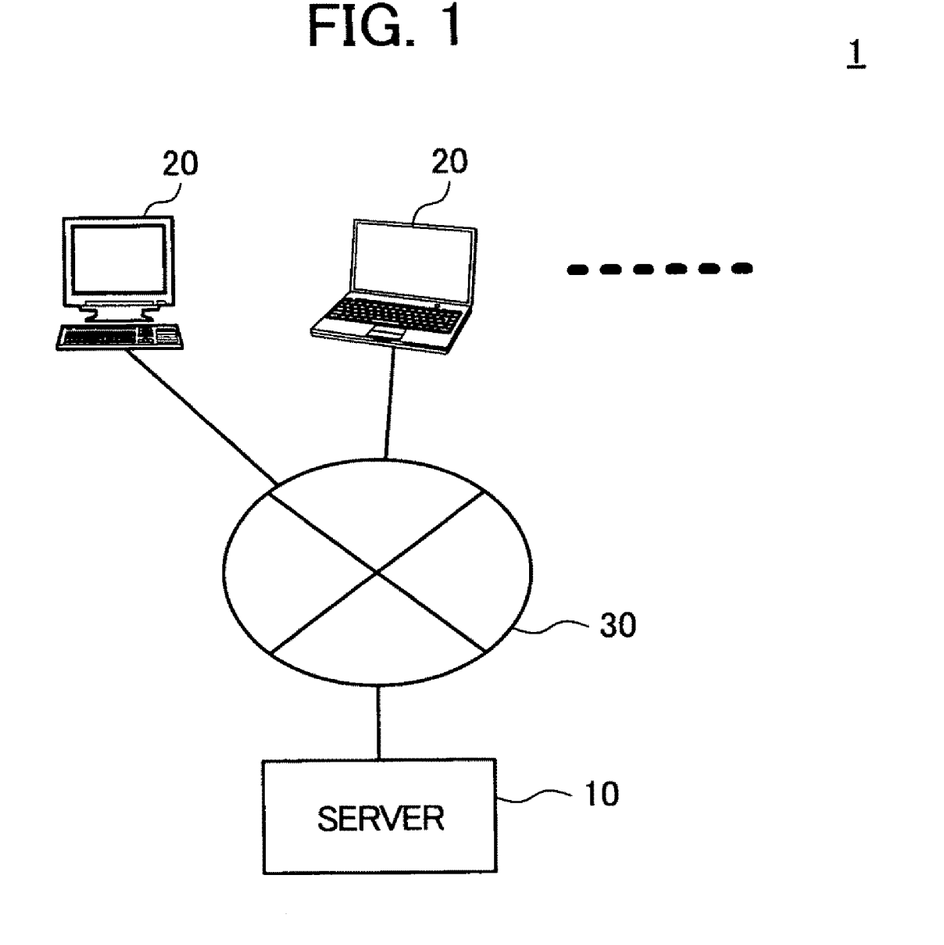
FIG. 1 shows an entire structure of a system 1 of a preferred embodiment according to the present invention.

FIG. 1 shows an entire structure of a system 1 of a preferred embodiment according to the present invention.

A server 10 is connectable to terminals 20 via a communication network 30. A computer of a preferred embodiment according to the present invention may be provided as the system 1 which is configured with the server 10 and the terminals 20. Alternatively, it may be provided as a stand-alone computer (e.g., only the terminal 20).

In addition, the communication network 30 which connects the terminals 20 and the server 10 may be provided, not just as one which provides wired communication, but as one of various types of communication networks which correspond to the technical idea of the present invention, such as one which provides wireless communication via a base station such as a cellular phone and the like, or one which provides communication with wireless LAN via an access point and the like.

[Hardware Structure of Server 10]

Figure 2:
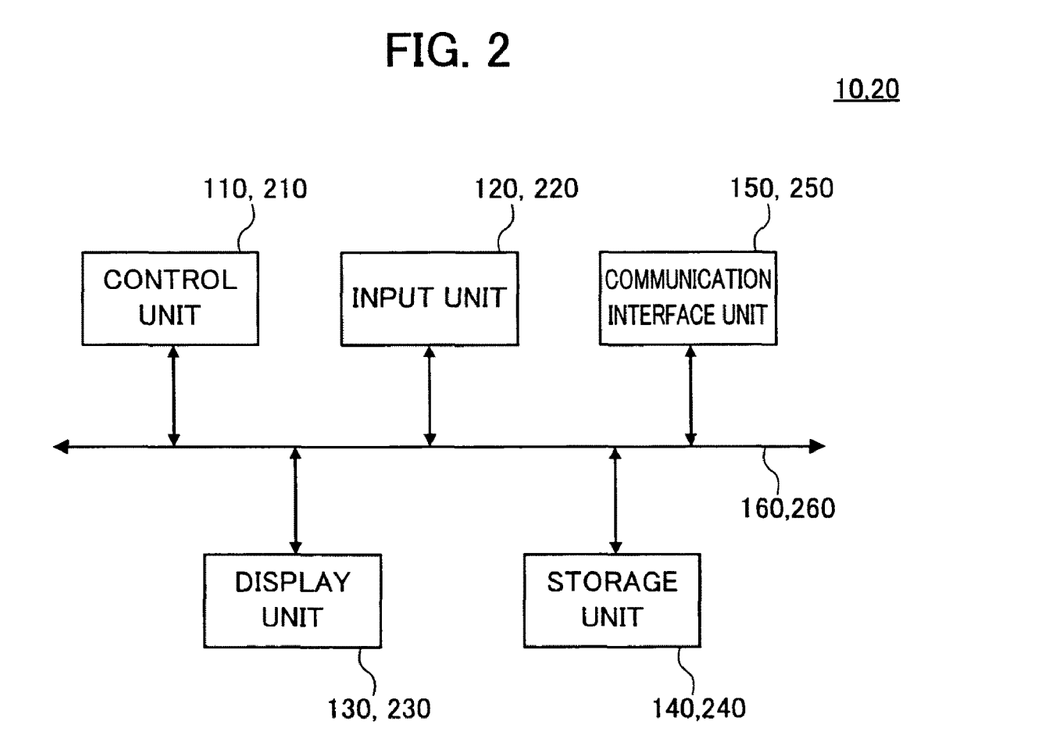
FIG. 2 shows a structure of a server 10 and terminals 20 of the preferred embodiment according to the present invention.

As illustrated in FIG. 2, the server 10 is configured with a control unit 110, an input unit 120, a display unit 130, a storage unit 140, and a communication interface unit 150 which are connected via a bus 160.

The control unit 110 may be configured with a CPU (Central Processing Unit), controls the entire server 10, and achieves various means described later in cooperation with such hardware by reading and executing programs stored in the storage unit 140, for example.

The storage unit 140 is an example of a storage medium storing the program, and may be a hard disk, semiconductor memory, or the like. The program may be stored on a portable storage medium (such as a CD or the like) to store the program in the storage unit 140. The input unit 120 may be achieved with a keyboard, a mouse, or the like. The display unit 130 may be achieved with a liquid crystal display, a cathode-ray tube CRT, or the like. The communication interface unit 150 may be achieved with a LAN adapter, a modem adapter, or the like.

The aforementioned example mainly describes the server 10; however, the aforementioned function may be provided by installing a program into a computer and running the computer as a server apparatus. Accordingly, the function provided by the server described as an embodiment of the present invention may be provided by performing the aforementioned method using the computer, or by installing the aforementioned program in the computer and executing it.

[Hardware Structure of Terminal 20]

Here, the terminals 20 may have the same structure as the aforementioned server 10. Note that the terminals 20 may be communication terminals other than so-called general purpose computers (PCs), such as cellular phones, PDAs (personal data assistants), or the like.

The terminal 20 is configured with a control unit 210, an input unit 220, a display unit 230, a storage unit 240, and a communication interface unit 250 which are connected via a bus 260.

[System Functional Structure]

Figure 3:
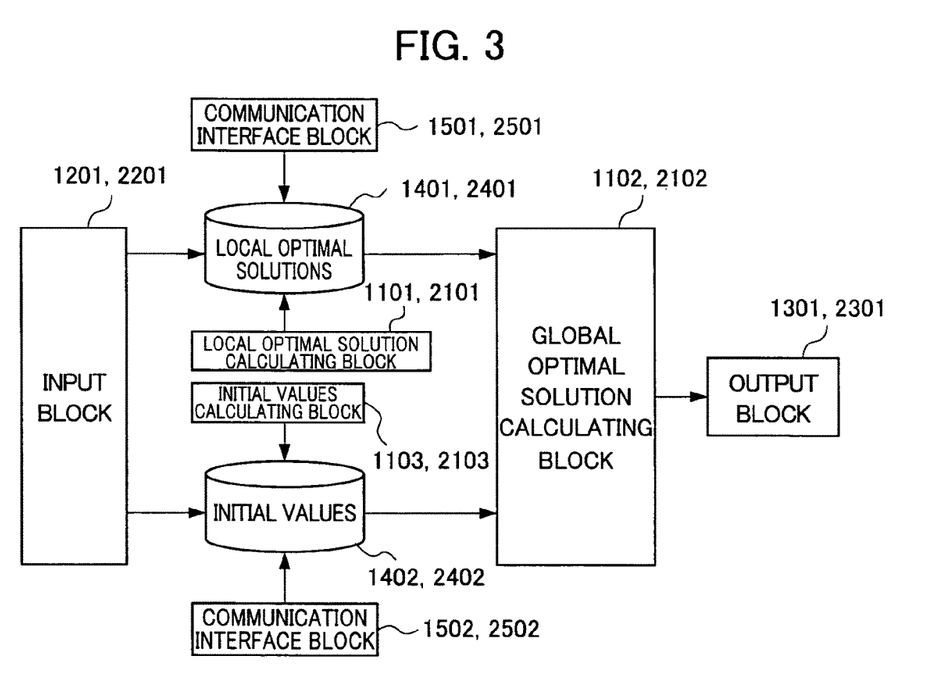
FIG. 3 is a functional block diagram of the server 10 and the terminals 20 of the preferred embodiment according to the present invention.

FIG. 3 is a functional block diagram of the server 10 and the terminal 20 of the preferred embodiment of the present invention.

The input unit 120 of the server 10 configures an input block 1201. Similarly, the input unit 220 of the terminal 20 configures an input block 2201. Moreover, the communication interface unit 150 of the server 10 configures a communication interface block 1501 and a communication interface block 1502. Similarly, the communication interface unit 250 of the terminal 20 configures a communication interface block 2501 and a communication interface block 2502. Furthermore, the control unit 110 of the server 10 configures a local optimal solution calculating block 1101, a global optimal solution calculating block 1102, and an initial values calculating block 1103. Similarly, the control unit 210 of the terminal 20 configures a local optimal solution calculating block 2101, a global optimal solution calculating block 2102, and an initial values calculating block 2103. In addition, the storage unit 140 of the server 10 is stored with local optimal solutions 1401 and initial values 1402. Similarly, the storage unit 240 of the terminal 20 is stored with local optimal solutions 2401 and initial values 2402. Moreover, the display unit 130 of the server 10 configures an output block 1301. Similarly, the display unit 230 of the terminal 20 configures an output block 2301.

As mentioned above, the server 10 and the terminals 20 of the preferred embodiment of the present invention may have the same structure as each other, or alternatively, they may achieve the present invention in cooperation with each other by configuring a so-called client/server by connecting to each other via the communication network 30.

[Main Flow]

Figure 4:
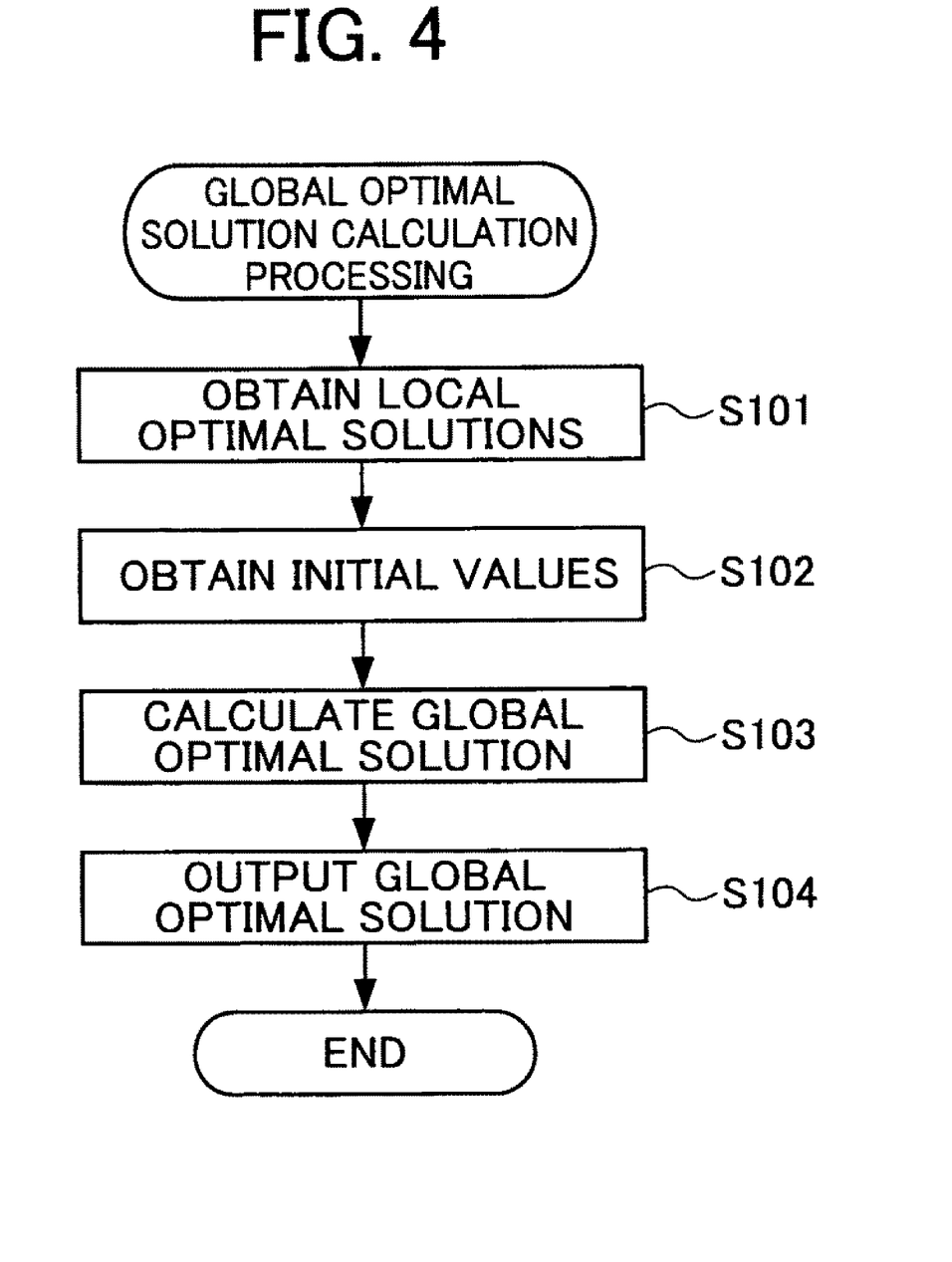
FIG. 4 is a flowchart showing global optimal solution calculation processing flow of a preferred embodiment according to the present invention.

FIG. 4 is a flowchart showing a global optimal solution calculation processing flow of a preferred embodiment of the present invention.

Note that the server 10 and the terminals 20 of the preferred embodiment of the present invention may achieve the present invention in cooperation with each other as mentioned above. Here, a case of configuring a so-called client/server is mainly described; however, the technical scope of the present invention is not limited thereto.

To begin with, in step S101, the local optimal solutions 1401 (or the local optimal solutions 2401) are obtained. More specifically, the input block 1201 (or the input block 2201) of the server 10 (or the terminal 20) may receive an input from a user. Alternatively, the input block 2201 of the terminal 20 may receive an input from a user, and the communication interface block 1501 of the server 10 may receive it via the communication network 30. Alternatively, the local optimal solution calculating block 1101 of the server 10 may calculate the local optimal solutions 1401 (or the local optimal solutions 2401).

Next, in step S102, the initial values 1402 (or the initial values 2402) are obtained. Specifically, the input block 1201 (or the input block 2201) of the server 10 (or terminal 20) may receive an input from a user. Alternatively, the input block 2201 of the terminal 20 may receive an input from a user, and the communication interface block 1501 of the server 10 may receive it via the communication network 30. Furthermore, as described in detail below while referring to FIG. 6, the initial values calculating block 1103 or the initial values calculating block 2103 may calculate the initial values 1402 (or the initial values 2402).

Next, in step S103, a global optimal solution is calculated. More specifically, the global optimal solution calculating block 1102 of the server 10 may calculate the global optimal solution based on the local optimal solutions 1401 (or the local optimal solutions 2401) and the initial values 1402 (or the initial values 2402).

Next, in step S104, the global optimal solution is output. More specifically, the output block 1301 of the server 10 may output (display) the global optimal solution. Alternatively, the global optimal solution transmitted from the server 10 to the terminal 20 via the communication network 30 may be output (displayed) by the output block 2301 of the terminal 20.

FIGS. 5A, 5B, 5C, and 5D are diagrams describing a concept of global optimal solution calculation processing of the preferred embodiment of the present invention, respectively.

Here, an example of a case of calculating a global optimal solution of design variables which minimize or maximize a combination of two objective variables (specific fuel consumption and nitrogen oxides emission concentration) for three combinations (modes) of multiple operating states (e.g., engine revolutions, loads, and the like) included in an engine operating area is given.

Figure 5A:
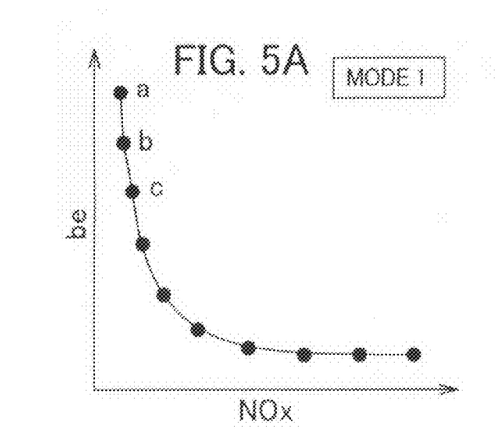
FIG. 5A is a diagram describing a concept of global optimal solution calculation processing of the preferred embodiment according to the present invention.
Figure 5B:
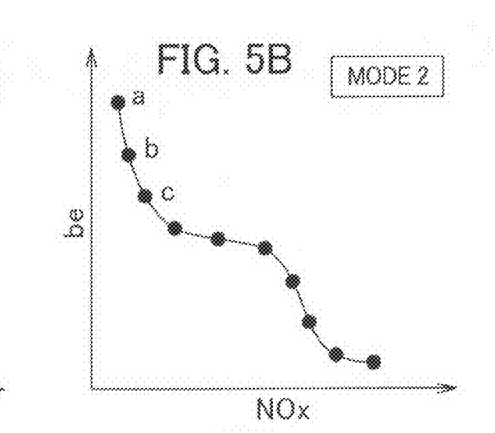
FIG. 5B is a diagram describing a concept of global optimal solution calculation processing of the preferred embodiment according to the present invention.
Figure 5C:
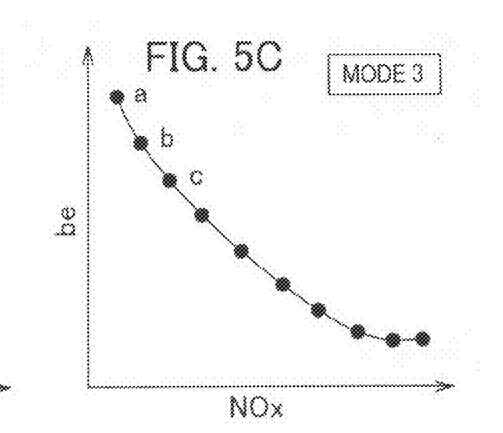
FIG. 5C is a diagram describing a concept of global optimal solution calculation processing of the preferred embodiment according to the present invention.
Figure 5D:
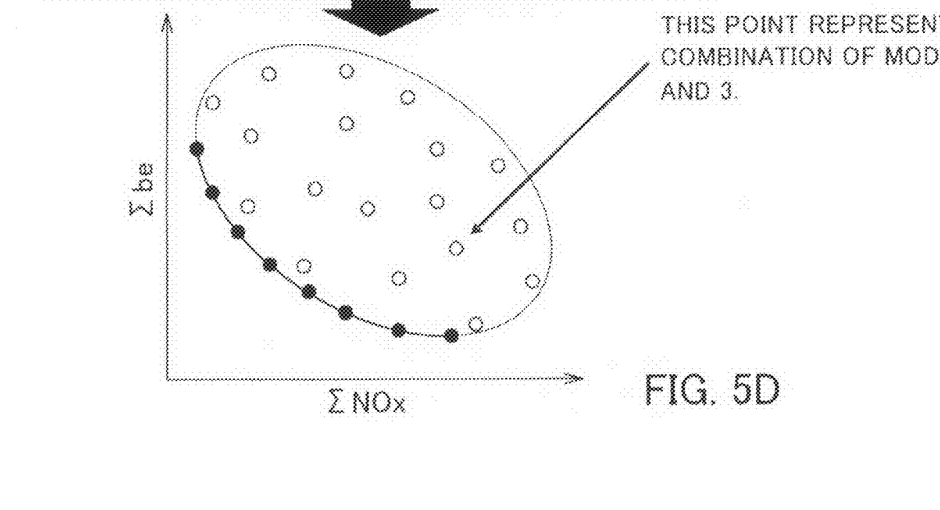
FIG. 5D is a diagram describing a concept of global optimal solution calculation processing of the preferred embodiment according to the present invention.

As illustrated in FIGS. 5A, 5B, and 5C, local optimal solutions of the design variables for three modes (mode 1 through mode 3) are calculated and input, respectively. In this embodiment, the global optimal solution (global Pareto solution) is calculated based on these three local optimal solutions. In this case, in the preferred embodiment according to the present invention, the global optimal solution (global Pareto solution) may be efficiently calculated with fewer generation numbers by inputting the initial values appropriately using a genetic algorithm.

Figure 6A:
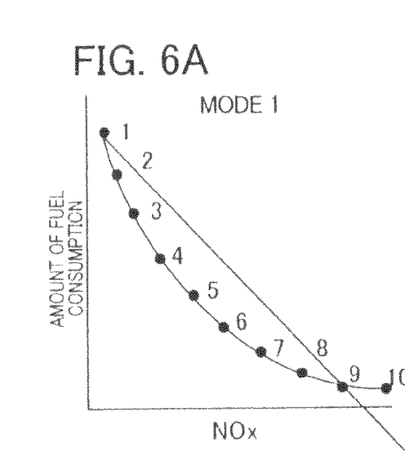
FIG. 6A is a diagram describing a concept of initial values calculation processing of a preferred embodiment according to the present invention.
Figure 6B:
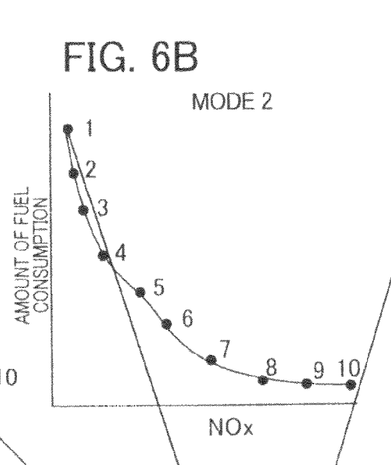
FIG. 6B is a diagram describing a concept of initial values calculation processing of the preferred embodiment according to the present invention.
Figure 6C:
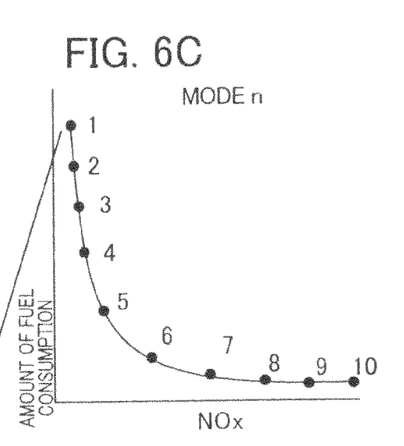
FIG. 6C is a diagram describing a concept of initial values calculation processing of the preferred embodiment according to the present invention.
Figure 6D:
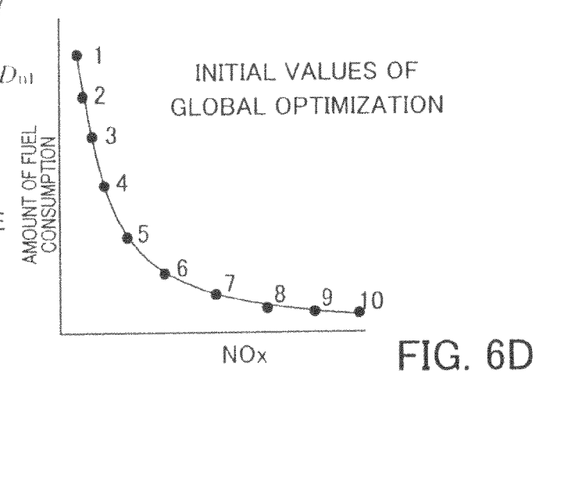
FIG. 6D is a diagram describing a concept of initial values calculation processing of the preferred embodiment according to the present invention.

FIGS. 6A through 6D are diagrams describing a concept of initial values calculation processing of a preferred embodiment according to the present invention. As illustrated in FIGS. 6A through 6C, when there are n modes for the two objective variables of specific fuel consumption and NOx (nitrogen oxides) emission concentration, for example, suffixes indicating NOx emission concentrations are appended in ascending order to local optimal solutions of the n design variables in each mode. Specifically, for example, for mode 1, the first local optimal solution is $D_{11}$, the second local optimal solution is $D_{12}$, . . . , and the nth local optimal solution is $D_{1n}$. In addition, for mode 2, the first local optimal solution is $D_{21}$, the second local optimal solution is $D_{22}$, . . . , and the nth local optimal solution is $D_{2n}$. In this manner, suffixes are appended to the local optimal solutions, and furthermore, of the local optimal solutions for each mode, the local optimal solutions which correspond to each other when arranged in ascending order of NOx emission concentrations are then summated. Specifically, for example, the local optimal solutions for the number of modes such as $D_{11}$, $D_{21}$, . . . , are summated. In addition, the resulting value is then adopted as one of the initial values for calculating the global optimal solution (FIG. 6D).

Similar calculation is performed for all local optimal solutions. Specifically, for the nth local optimal solution in the aforementioned example, local optimal solutions for the number of modes such as $D_{1n}$, $D_{2n}$, . . . , are summated. The global optimal solution is calculated based on the initial values calculated as described above. In this manner, the global optimal solution is calculated more efficiently using a genetic algorithm based on the relatively more appropriate initial values.

Note that, as illustrated in FIGS. 6A through 6D, products of a predetermined weight multiplied by each mode (specifically, weights for respective local optimal solutions, for example, $W_1$ for the first local optimal solution $D_{11}$, $W_2$ for the second local optimal solution $D_{12}$, ..., and $W_n$ for the nth local optimal solution $D_{1n}$) may be summated when summating the local optimal solutions. In this case, the weights are reflected in the obtained global optimal solution.

FIG. 7A and FIG. 7B, and FIG. 8A and FIG. 8B show comparative results between calculation results of 250 generation numbers, 1000 generation numbers, 2500 generation numbers, and 5000 generation numbers using a genetic algorithm without inputting initial values for two objective variables (specific fuel consumption (q) and nitrogen oxides emission concentration (NOx)) by a conventional method, and results of a simple summation of respective local optimal solutions (objective solutions) in the case of mode 13.

Figure 7A:
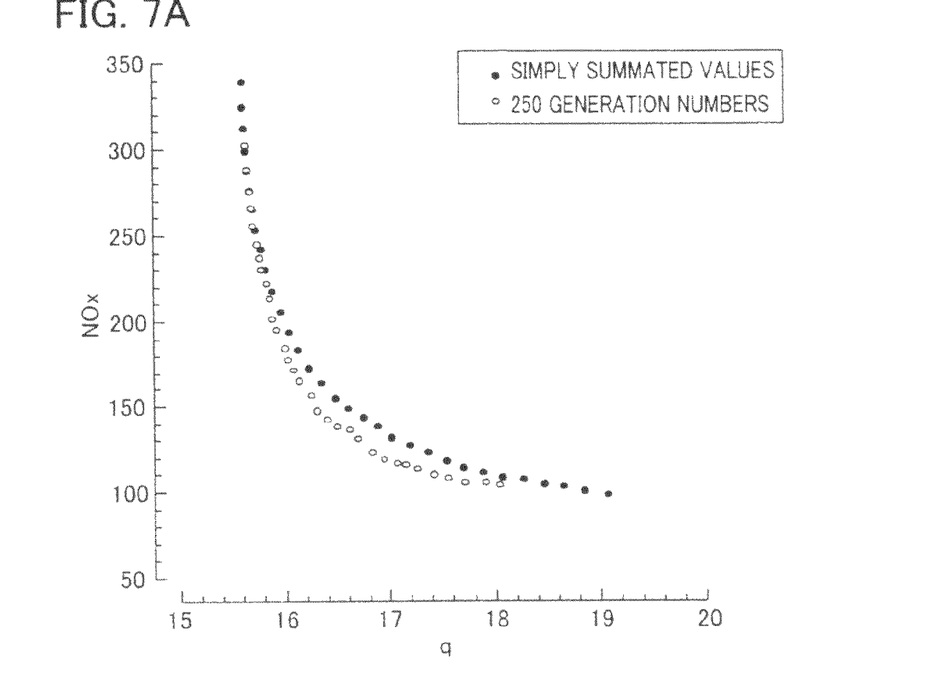
FIG. 7A is a diagram showing an exemplary output (display) result of conventional global optimal solution calculation processing.

In FIG. 7A, the calculation results using a genetic algorithm cannot sufficiently express the objective solutions for both ends of the global optimal solution, that is, a portion where q is low and NOx is high, and a portion where q is high and NOx is low.

Figure 7B:
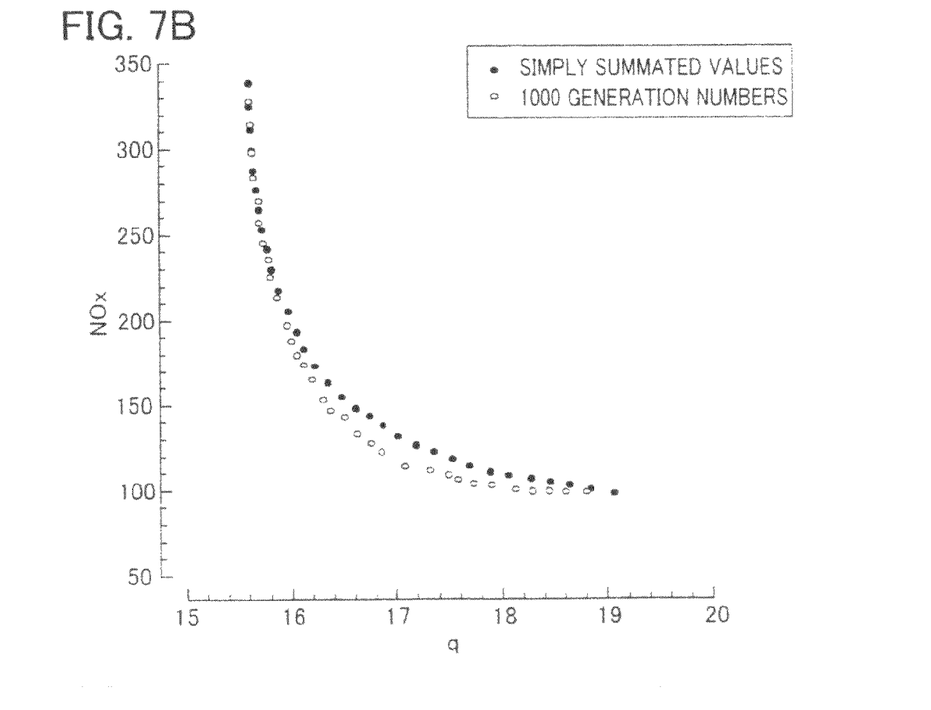
FIG. 7B is a diagram showing an exemplary output (display) result of conventional global optimal solution calculation processing.
Figure 8A:
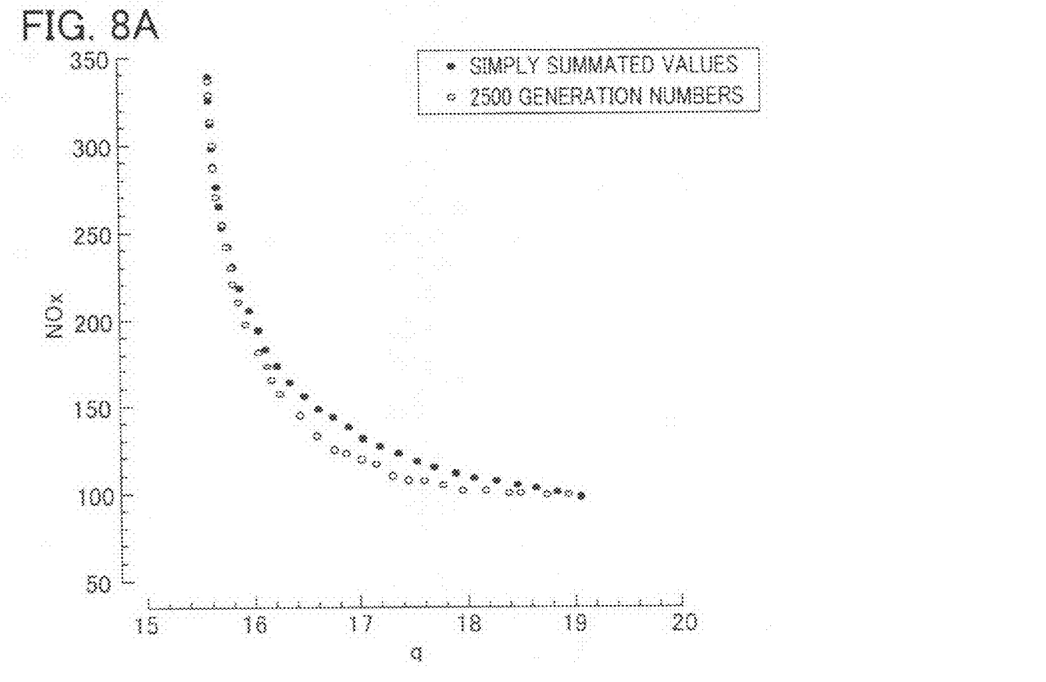
FIG. 8A is a diagram showing an exemplary output (display) result of conventional global optimal solution calculation processing.
Figure 8B:
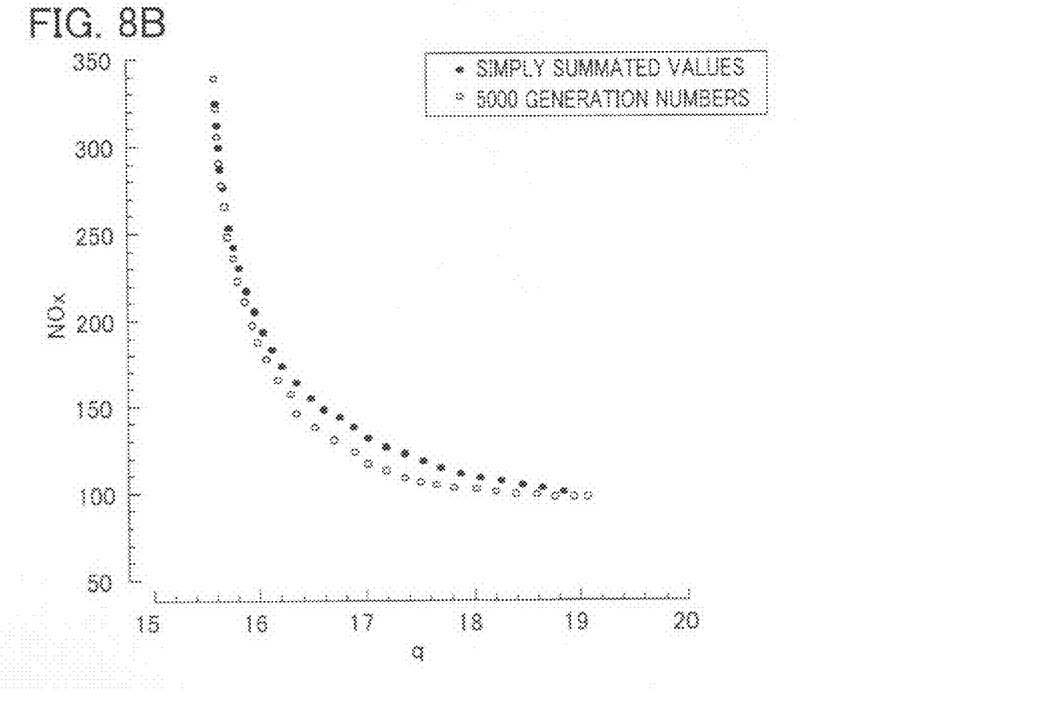
FIG. 8B is a diagram showing an exemplary output (display) result of conventional global optimal solution calculation processing.

It is apparent from FIG. 7B and subsequent drawings that the aforementioned problem may be gradually alleviated by increasing the generation numbers, and the fact that calculation results almost the same as the objective solutions may be obtained as a result of calculating 5000 generation numbers is apparent from FIG. 8B.

Figure 9:
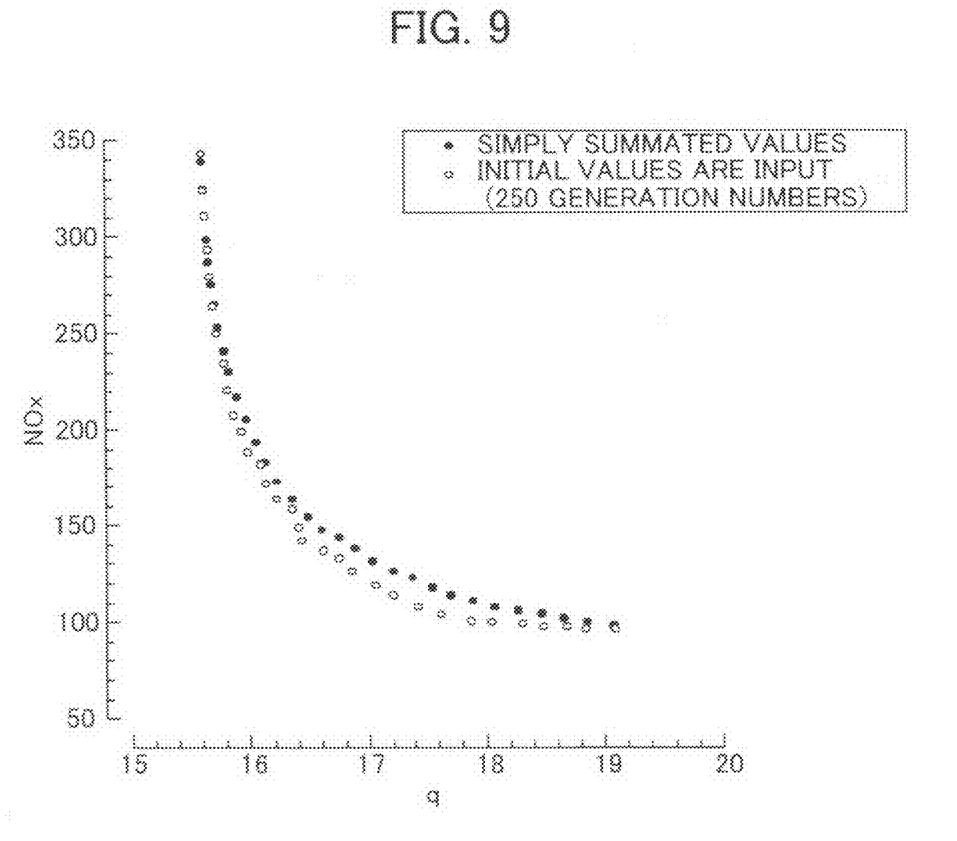
FIG. 9 is a diagram showing an exemplary output (display) result of global optimal solution calculation processing of the preferred embodiment according to the present invention.

FIG. 9 shows a result of calculating 250 generation numbers by inputting initial values when using a genetic algorithm as an example of the preferred embodiment of the present invention. As is apparent from the drawing, it is possible to obtain calculation results almost the same as the objective solutions even if generation numbers are few. Calculation efficiency is improved by (5000−250)/5000=95% for generation numbers compared to the conventional method.

Similarly, FIG. 10A and FIG. 10B, and FIG. 11A and FIG. 11B show, in the case of mode 51, by the conventional method, comparative results for calculation results of 250 generation numbers, 1000 generation numbers, 2500 generation numbers, and 5000 generation numbers using a genetic algorithm without inputting initial values for two objective variables (specific fuel consumption (q) and nitrogen oxides emission concentration (NOx)), and results of simple summation of respective local optimal solutions (objective solutions).

Figure 10A:
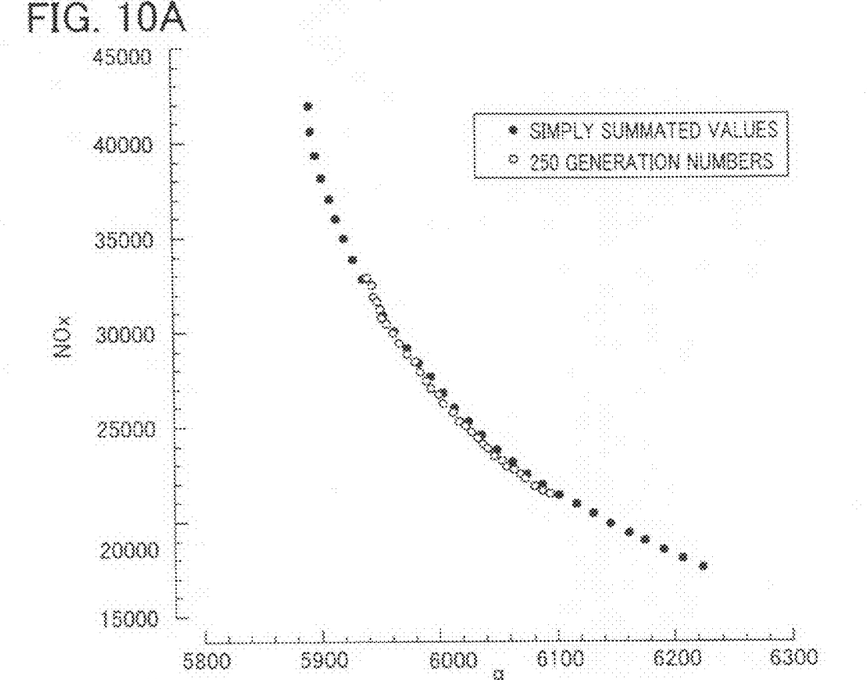
FIG. 10A is a diagram showing an exemplary output (display) result of conventional global optimal solution calculation processing.

In FIG. 10A, calculation results using a genetic algorithm cannot sufficiently express the objective solutions for both ends of the global optimal solution, that is, a portion where q is low and NOx is high, and a portion where q is high and NOx is low. An insufficient area becomes larger even compared to the case of mode 13 in FIG. 7A.

Figure 10B:
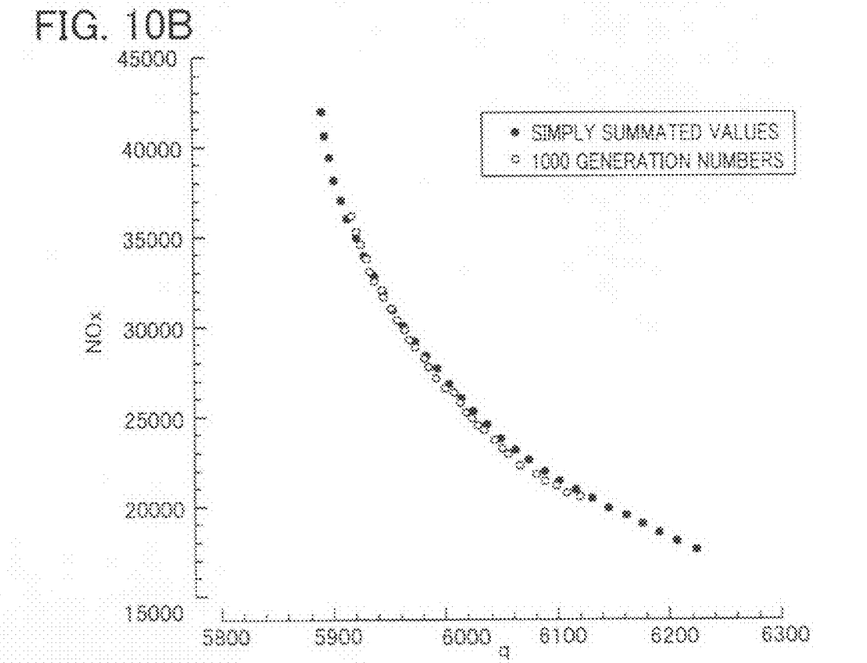
FIG. 10B is a diagram showing an exemplary output (display) result of conventional global optimal solution calculation processing.
Figure 11A:
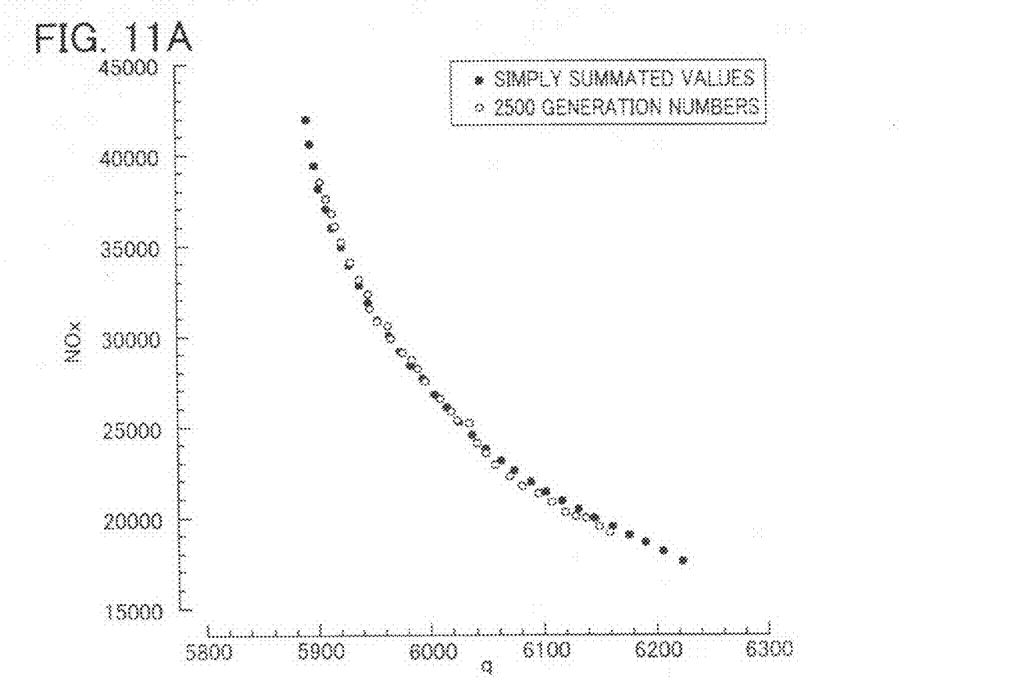
FIG. 11A is a diagram showing an exemplary output (display) result of conventional global optimal solution calculation processing.
Figure 11B:
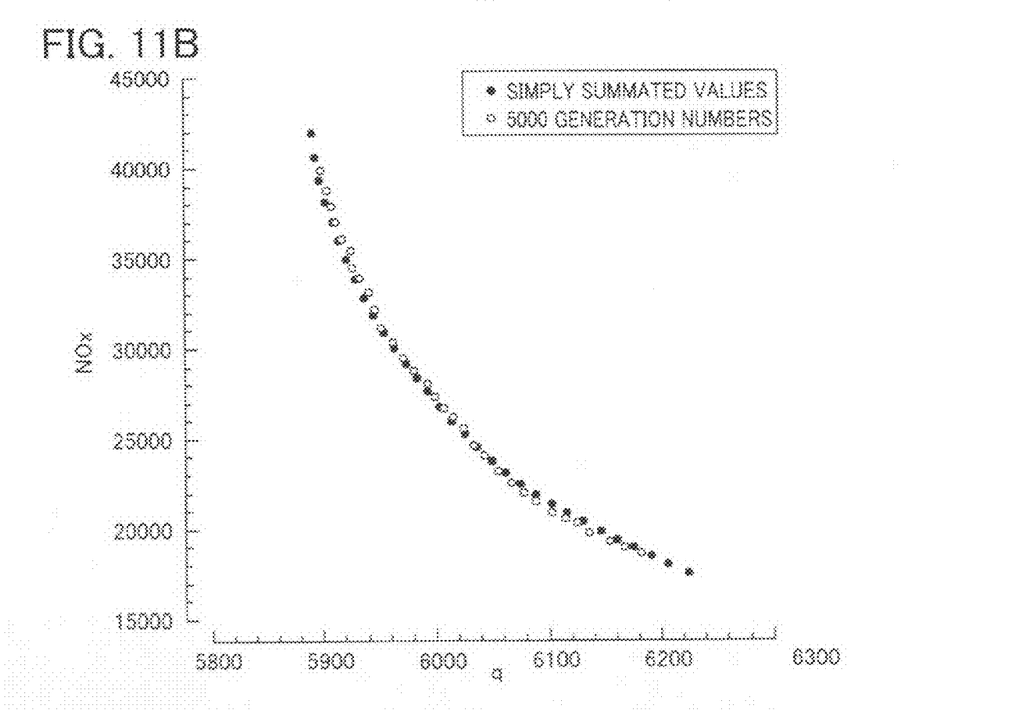
FIG. 11B is a diagram showing an exemplary output (display) result of conventional global optimal solution calculation processing.

It is apparent from FIG. 10B and subsequent drawings that the aforementioned problem may be gradually alleviated by increasing the generation numbers, and the fact that calculation results almost the same as the objective solutions may be obtained as a result of calculating 5000 generation numbers is apparent from FIG. 11B. Nevertheless, a larger insufficient area than the case of mode 13 in FIG. 8B still remains.

Figure 12:
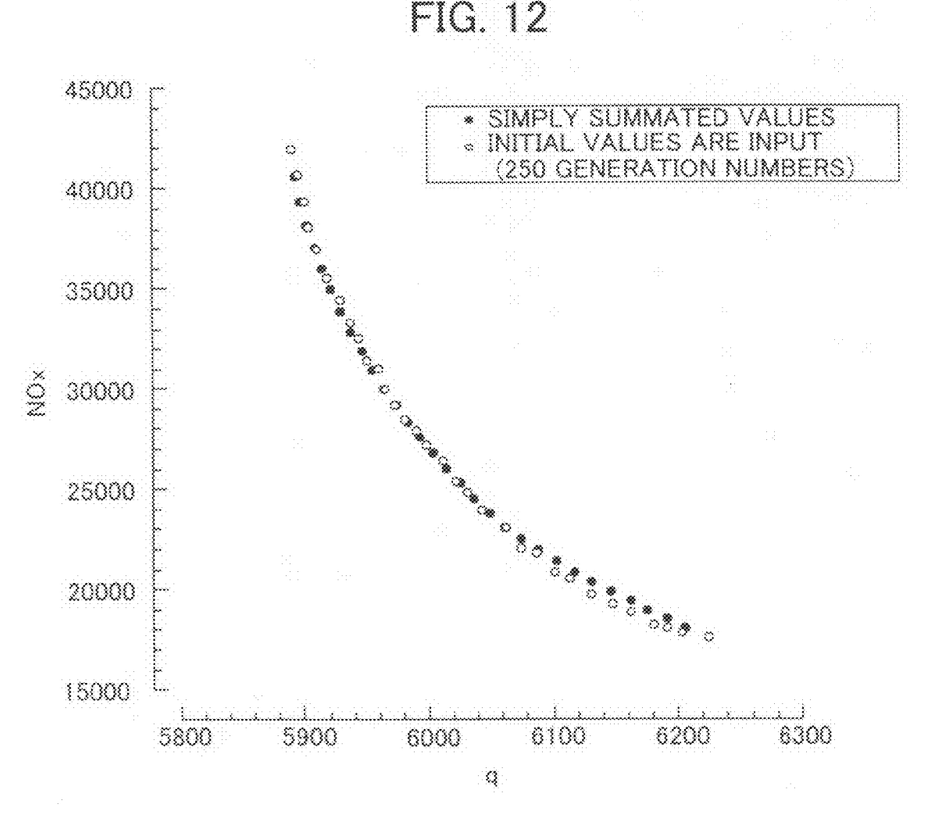
FIG. 12 is a diagram showing an exemplary output (display) result of global optimal solution calculation processing of the preferred embodiment according to the present invention.

FIG. 12 shows a result of calculating 250 generation numbers by inputting initial values when using a genetic algorithm as an example of the preferred embodiment according to the present invention. As is apparent from the drawing, it is possible to obtain calculation results almost the same as the objective solutions even if generation numbers are few. Calculation efficiency may be improved by (5000−250)/5000=95% for generation numbers compared to the conventional method. In addition, there is almost no insufficient area, meaning that objective solutions are being further preferably calculated than the calculation results of 5000 generation numbers using the conventional method.

What is claimed is:

1. A method of calculating a global optimal solution of engine-related design variables which minimize or maximize a combination of a plurality of objective variables for a plurality of combinations of a plurality of operating states included in an operating area of an engine using a computer, the method comprising:
   obtaining local optimal solutions of the design variables which minimize or maximize a combination of the plurality of objective variables which are calculated for each of the plurality of combinations of the plurality of operating states;
   obtaining initial values of a combination of the plurality of design variables used for calculating the global optimal solution; and
   calculating the global optimal solution by solving, using a genetic algorithm based on the local optimal solutions and the initial values, an equation, which should be satisfied by the plurality of design variables,
   wherein each of the initial values is used as a resulting value that is obtained through summation of local optimal solutions of the plurality of objective variables corresponding to each other when arranged in ascending or descending order.

2. The method according to claim 1, wherein
in the calculating of the global optimal solution, the equation is the objective variables expressed in a polynomial equation of high degree including the plurality of design variables.

3. The method according to claim 1, wherein
in the calculating of the global optimal solution, the equation is the objective variables expressed in an RBF (Radial Basis Function) model equation including the plurality of design variables.

4. The method according to claim 1, wherein
the operating states include at least revolutions of the engine and load on the engine.

5. The method according to claim 1, wherein
the objective variables include at least specific fuel consumption of the engine and nitrogen oxides emission concentration.

6. The method according to claim 1, wherein a program which allows execution of each step provided in the method is used.

7. A computer for calculating a global optimal solution of engine-related design variables which minimize or maximize a combination of a plurality of objective variables for a plurality of combinations of a plurality of operating states included in an operating area of an engine, comprising:
   a local optimal solutions calculating means for obtaining local optimal solutions of the design variables which minimize or maximize a combination of the plurality of objective variables which are calculated for each of the plurality of combinations of the plurality of operating states;
   an initial values calculating means for obtaining initial values of a combination of the plurality of design variables used for calculating the global optimal solution; and
   a global optimal solution calculating means for calculating the global optimal solution by solving, using a genetic algorithm based on the local optimal solutions and the initial values an equation, which should be satisfied by the plurality of design variables, wherein each of the initial values is used as a resulting value that is obtained through summation of local optimal solutions of the plurality of objective variables corresponding to each other when arranged in ascending or descending order.

8. A recording medium on which a program of instructing a computer to calculate a global optimal solution of engine-related design variables which minimize or maximize a combination of a plurality of objective variables for a plurality of combinations of a plurality of operating states included in operating area of an engine is stored, the program comprising steps of:

obtaining local optimal solutions of the design variables which minimize or maximize a combination of the plurality of objective variables which are calculated for each of the plurality of combinations of the plurality of operating states;

obtaining initial values of a combination of the plurality of design variables used for calculating the global optimal solution; and calculating the global optimal solution by solving, using a genetic algorithm based on the local optimal solutions and the initial values, an equation, which should be satisfied by the plurality of design variables, wherein each of the initial values is used as a resulting value that is obtained through summation of local optimal solutions of the plurality of objective variables corresponding to each other when arranged in ascending or descending order.

* * * * *